(12) United States Patent
Dearden et al.

(10) Patent No.: US 7,097,199 B2
(45) Date of Patent: Aug. 29, 2006

(54) AIRBAG COVER EMBLEM ATTACHMENT APPARATUS AND METHOD

(75) Inventors: Eugene Dearden, Layton, UT (US); David Jones, South Weber, UT (US); Marc Folsom, Salt Lake City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 309 days.

(21) Appl. No.: 10/671,098

(22) Filed: Sep. 25, 2003

(65) Prior Publication Data

US 2005/0067815 A1   Mar. 31, 2005

(51) Int. Cl.
  *B60R 21/16* (2006.01)
(52) U.S. Cl. ..................... 280/728.3; 280/731
(58) Field of Classification Search ............ 280/728.3, 280/731; 403/348, 349, 319, 320, 326, 329, 403/280
  See application file for complete search history.

(56) References Cited

U.S. PATENT DOCUMENTS

| | | | |
|---|---|---|---|
| 1,987,215 A | | 1/1935 | Romig |
| 2,156,003 A | | 4/1939 | Tinnerman |
| 3,670,120 A | | 6/1972 | Corn et al. |
| 4,767,647 A | | 8/1988 | Bree |
| 5,409,256 A | * | 4/1995 | Gordon et al. ........... 280/728.2 |
| 5,445,406 A | * | 8/1995 | Jones ....................... 280/728.2 |
| 5,678,851 A | * | 10/1997 | Saito et al. .............. 280/728.3 |
| 5,775,721 A | * | 7/1998 | Grout ........................ 280/727 |
| 5,851,022 A | | 12/1998 | Yamamoto et al. |
| 5,928,591 A | | 7/1999 | Blumenschein et al. |
| 6,058,577 A | | 5/2000 | Ida et al. |
| 6,209,905 B1 | | 4/2001 | Preisler et al. |
| 6,264,869 B1 | | 7/2001 | Notarpietro et al. |
| 6,309,582 B1 | | 10/2001 | Wu |
| 2001/0052690 A1 | | 12/2001 | Nishiura et al. |
| 2002/0000712 A1 | | 1/2002 | Derrick et al. |
| 2003/0047922 A1 | * | 3/2003 | Ford et al. ................. 280/731 |

FOREIGN PATENT DOCUMENTS

| | | |
|---|---|---|
| EP | 0 742 123 | 7/1998 |
| JP | 10-119683 | 5/1998 |

* cited by examiner

*Primary Examiner*—Paul N. Dickson
*Assistant Examiner*—Tiffany L. Webb
(74) *Attorney, Agent, or Firm*—Sally J Brown

(57) ABSTRACT

An enhanced fastening assembly may be used, for example, to attach an emblem to an airbag cover. The fastening assembly may include the emblem and a backing member. The emblem may have a panel with a decorative surface and one or more protrusions extending from the opposite side of the panel. Each protrusion has a proximal end adjacent to the panel and a larger distal end. The protrusions extend through openings in the cover. The backing member has open-ended slots that receive the proximal ends to interfere with withdrawal of the distal ends through the openings. Tabs adjacent to the slots snap into position to abut the distal ends to restrict removal of the backing plate from the emblem. In one alternative embodiment, the emblem also has hooks that pass through additional holes in the cover and engage supplemental slots of the backing member to provide for more secure attachment.

27 Claims, 4 Drawing Sheets

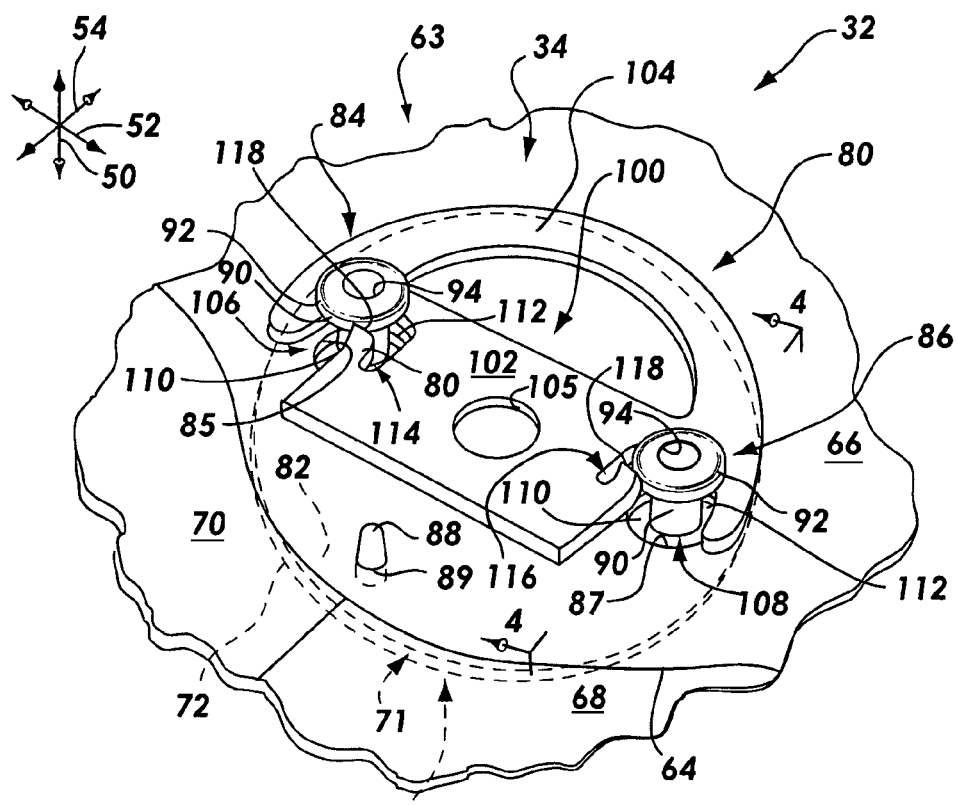
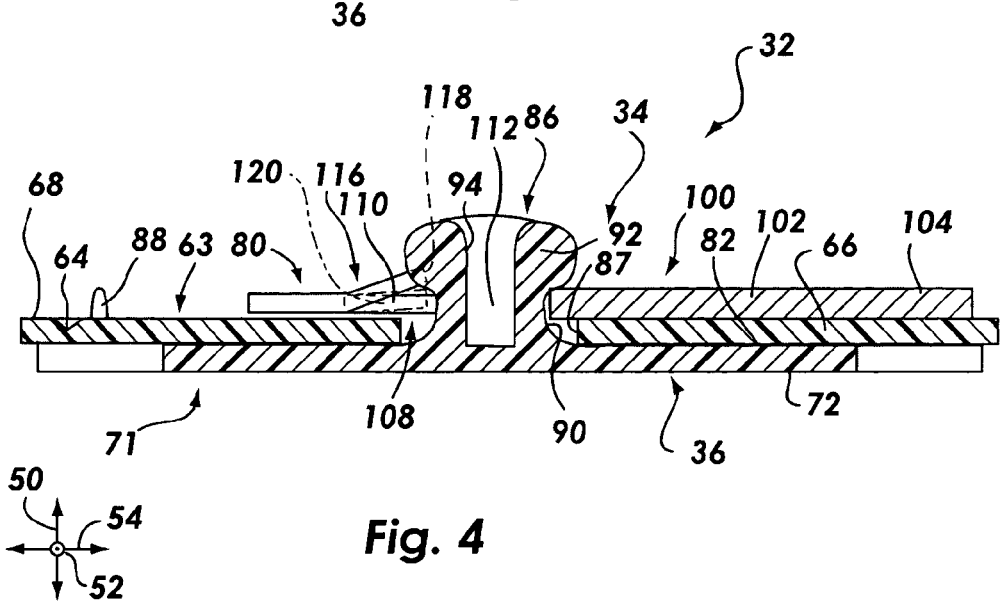

AIRBAG COVER EMBLEM ATTACHMENT APPARATUS AND METHOD

BACKGROUND OF THE INVENTION

1. Field of the Invention

The present invention relates to systems and methods for protecting vehicle occupants from injury. More specifically, the present invention relates to a system and method for attaching a decorative emblem to an airbag cover.

2. Description of Related Art

The inclusion of inflatable safety restraint devices, or airbags, is now a legal requirement for many new vehicles. Airbags are typically installed in the steering wheel and in the dashboard on the passenger side of a car. Additionally, airbags may be installed to inflate beside the passenger to provide side impact protection, in front of the knees to protect the knees and/or maintain the posture of the occupant during impact, or at other strategic locations.

In the event of an accident, an accelerometer within the vehicle measures the abnormal deceleration and triggers the deployment of an inflator that contains compressed gas and/or a pyrotechnic material. Expanding gases from the inflator fill the airbags, which immediately inflate to protect the driver and/or passengers from impact against the interior surfaces of the vehicle. During normal vehicle operation, airbags are typically stowed behind covers to protect them from tampering and to provide a more attractive interior facade for the vehicle.

Typically, the cushion and inflator are stowed behind some type of cover within the vehicle. The cover protects the cushion and inflator from tampering and provides a relatively attractive facade to match the remainder of the vehicle interior. Tear seams formed by stitched openings or thin material sections in the cover cause the cover to open in a predictable manner when the cushion inflates. Often, a manufacturer's logo or other emblem is attached to the cover to enhance its appearance.

Unfortunately, known emblem attachment schemes have a number of inherent problems. With some known attachment schemes, the emblem is not attached firmly enough to remain in place during deployment of the cushion. In some cases, the attachment method may permit improper assembly of the emblem and the cover, thereby causing poor attachment of the emblem or attachment in the wrong orientation. Yet further, some known attachment schemes are somewhat difficult to carry out, and require excessive labor, tooling, or other resources that add to the overall cost of the airbag module.

Furthermore, known fastening systems in general tend to have similar problems. Fastening systems are used for a wide variety of applications, many of which would benefit from more secure, fail-safe, and easy attachment.

SUMMARY OF THE INVENTION

The apparatus and method of the present invention have been developed in response to the present state of the art, and in particular, in response to the problems and needs in the art that have not yet been fully solved by currently available fastening systems and methods, particularly automotive emblem attachment systems and methods. Thus, it is an overall objective of the present invention to provide fastening systems and methods that are capable of remedying the shortcomings of the prior art. Such systems and methods may provide more secure and fail-safe attachment, simplify manufacturing and assembly processes and tooling, reduce inventories, and decrease the overall cost of products such as airbag modules.

In accordance with the invention as embodied and broadly described herein in one embodiment, an enhanced fastening assembly is used as part of an airbag module. The airbag module may be adapted to serve in a variety of protective capacities; for example, the airbag module may be used to protect a vehicle driver from frontal impact.

The airbag module has a cushion installed in a steering wheel of a vehicle. An inflator of the airbag module is disposed adjacent to the cushion to produce inflation gas to inflate the cushion. The airbag module also has a cover assembly that forms the cover of the steering wheel. The cushion and the inflator are disposed behind the cover such that the cover forms a decorative facade for the airbag module. The cover has tear seams that permit the cover to rupture predictably to release the cushion upon deployment. The cover assembly also has a fastening assembly attached to the cover. The fastening assembly includes an emblem with a panel having a decorative surface that faces the vehicle occupant to denote the make of the vehicle and/or enhance the appearance of the cover.

The fastening assembly also includes a backing member disposed on the inward side of the cover, adjacent to the cushion. The backing member and the emblem are attached together such that the backing member securely holds the emblem in place during deployment of the airbag module. Hence, when a collision occurs, the inflator receives an activation signal and produces inflation gas, which enters the cushion. The cushion expands to rupture the tear seams and emerge from the steering wheel. The emblem and the backing member remain attached to one of the panels of the ruptured cover during deployment.

The emblem and the backing member are uniquely configured to provide secure attachment and easy installation. The panel of the emblem has a backing surface facing away from the decorative surface. Two protrusions and an orientation post extend from the backing surface and protrude through corresponding openings in the cover. The orientation post ensures that the emblem cannot be installed upside down by inserting each protrusion through the opening intended to receive the other protrusion.

Each protrusion has a proximal end adjacent to the backing surface and a distal end further displaced from the backing surface. The distal ends are larger than the proximal ends so that each protrusion has a mushroom-like shape. Each protrusion also has a bore extending along its axis and into the adjacent portion of the panel. The bore enables injection molding to be used to form the emblem of plastic without excessive deformation of the decorative surface during cooling of the plastic.

The backing member has a plate including a central portion and a support member. The support member extends generally within the plane of the central portion, parallel to the panel of the emblem. The support member may be substantially coextensive with the panel so that the support member is able to reduce the likelihood that the panel will tear through the cover during deployment. The central portion has two slots, each of which is sized and positioned to receive the proximal end of one of the protrusions. Each slot has an open first end and a second end. Furthermore, a tab is disposed adjacent to each of the slots to enable the protrusions to be locked into engagement with the slots.

The backing member can be inserted along a direction generally parallel to the panel to cause the proximal ends of the protrusions to enter the slots via the first ends. The backing member can then be moved further to cause the protrusions to move from the first ends to the second ends. As the protrusions move toward the second ends, they deflect the tabs to a position generally parallel with the plate. When the protrusions reach the second ends, the tabs snap out from underneath the distal ends such that retention edges of the tabs abut the distal ends to keep the protrusions from moving back toward the first ends of the slots. Thus, the backing member cannot be withdrawn along a direction opposite to its installation without first deflecting the tabs.

According to one alternative embodiment of the invention, the emblem may have three hooks in addition to the protrusions and in place of the orientation post. Each hook extends through a corresponding opening in the cover. The backing member has three supplemental slots, each of which is disposed to receive one of the hooks when the backing member is moved parallel to the panel to engage the protrusions. The engagement of the hooks and supplemental slots enhances the engagement of the backing member with the emblem.

Through the use of the fastening assemblies and associated methods of the present invention, parts may be more easily and securely attached together on either side of a wall such as an airbag cover. Such fastening assemblies are especially useful for attaching emblems to covers for airbag modules. Through the use of such fastening assemblies, airbag modules may be more economically made, with a lower likelihood of detachment of the emblem during deployment of the airbag. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 is a perspective view of the interior of the steering wheel of the vehicle of FIG. 1, illustrating the backing member of the cover assembly;

FIG. 4 is a side elevation, section view of the cover assembly of the vehicle of FIG. 1.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together.

Figure 1:
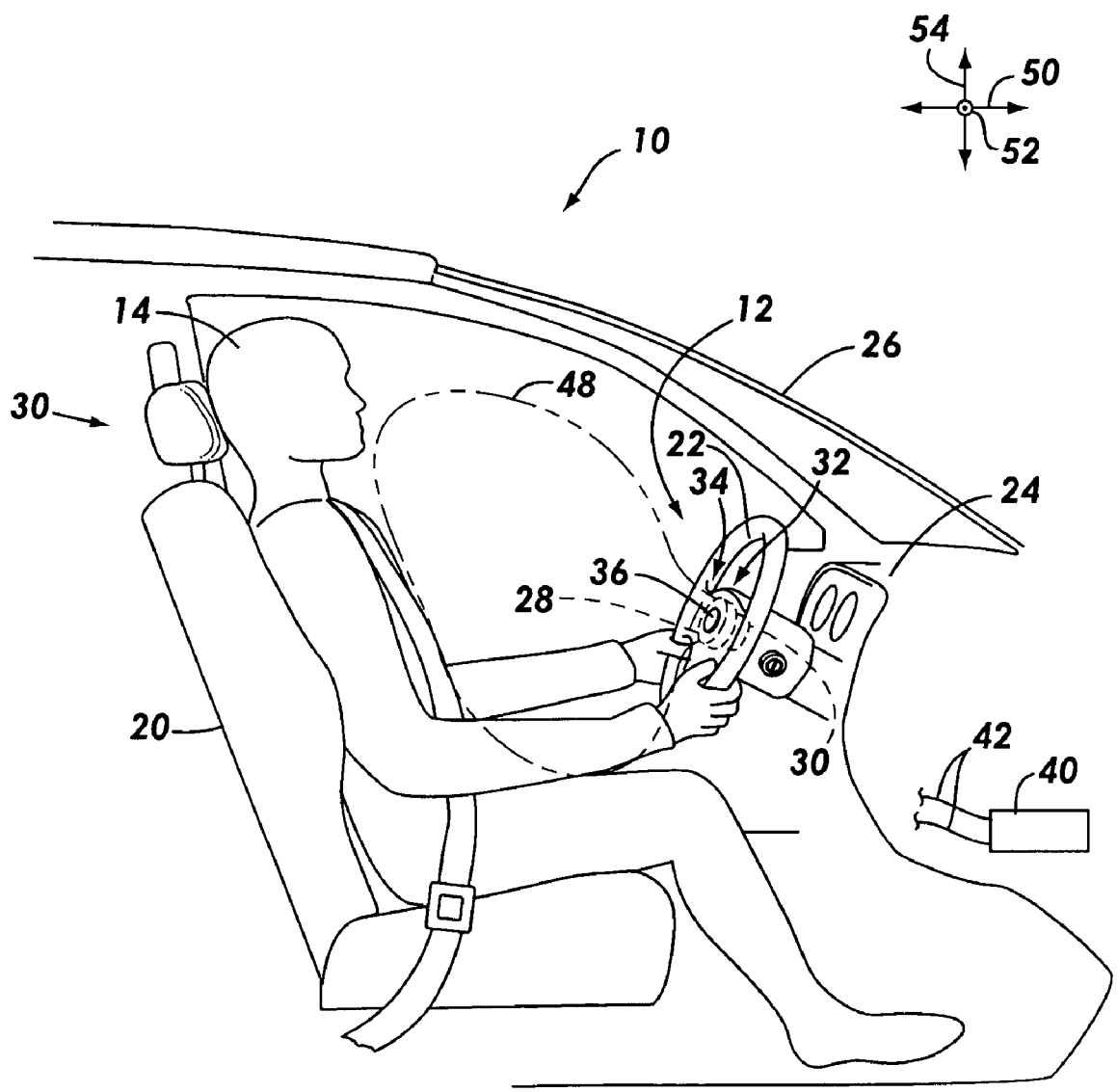
FIG. 1 is a side elevation, section view of a vehicle incorporating an airbag module with a cover assembly according to one embodiment of the invention.

Referring to FIG. 1, a side elevation, section view depicts an interior portion of a vehicle 10 having an airbag module 12 according to one embodiment of the invention. The airbag module 12, of FIG. 1 is simply one application for fastening assemblies according to the invention; the principles of the present invention are applicable to any situation in which an article is to be fastened to a rigid or flexible wall. Hence, the structures and methods disclosed herein may be used with many types of airbags including driver's and passenger's side frontal impact airbags, side impact airbags, knee bolsters, inflatable curtains, and the like.

In FIG. 1, a vehicle occupant 14 is shown seated in a front seat 20. The front seat 20 faces a steering wheel 22, an instrument panel 24, and a windshield 26. The airbag module 12 includes a cushion 28, which is stowed within the steering wheel 22. The airbag module 12 also includes an inflator 30 disposed within the steering wheel 22, adjacent to the cushion 28 such that the inflator 30 is able to expel inflation gas directly into the cushion 28.

Additionally, the airbag module 12 includes a cover assembly 32 that provides a decorative facade to cover the cushion 28 and the inflator 30 and protect them from tampering. The cover assembly 32 has a fastening assembly 34 that includes an emblem 36 positioned to face the occupant 14 to enhance the appearance of the steering wheel 22. The emblem 36 may display a logo indicating the manufacturer of the vehicle 10, or the like.

The vehicle 10 also includes an electronic control unit (ECU) 40, which includes or is coupled to one or more sensors that detect a current or impending collision involving the vehicle 10. A pair of lead wires 42 is attached to the ECU 40. The lead wires 42 provide electrical communication between the ECU 40 and the inflator 30. In response to detection of a collision, the ECU 40 generates an activation signal, which is transmitted to the inflator 30 via the lead wires 42 to trigger deployment of the inflator 30. The inflator 30 discharges pressurized inflation gas into the cushion 28, and the cushion expands to assume an inflated position 48. In the inflated position 48, the cushion 28 helps to prevent the upper body of the occupant 14 from striking the windshield 26, the instrument panel 24, or the steering wheel 22.

The fastener assembly 34 may be structured in such a manner that the emblem 36 remains attached to the steering wheel 22 during deployment of the airbag module 12. The configuration and operation of the fastener assembly 34 will be shown and described in greater detail with reference to FIGS. 2 through 4, as follows. In the following figures, a longitudinal direction 50, a lateral direction 52, and a transverse direction 54 are used, and are oriented as shown by the corresponding arrows in FIG. 1.

Figure 2:
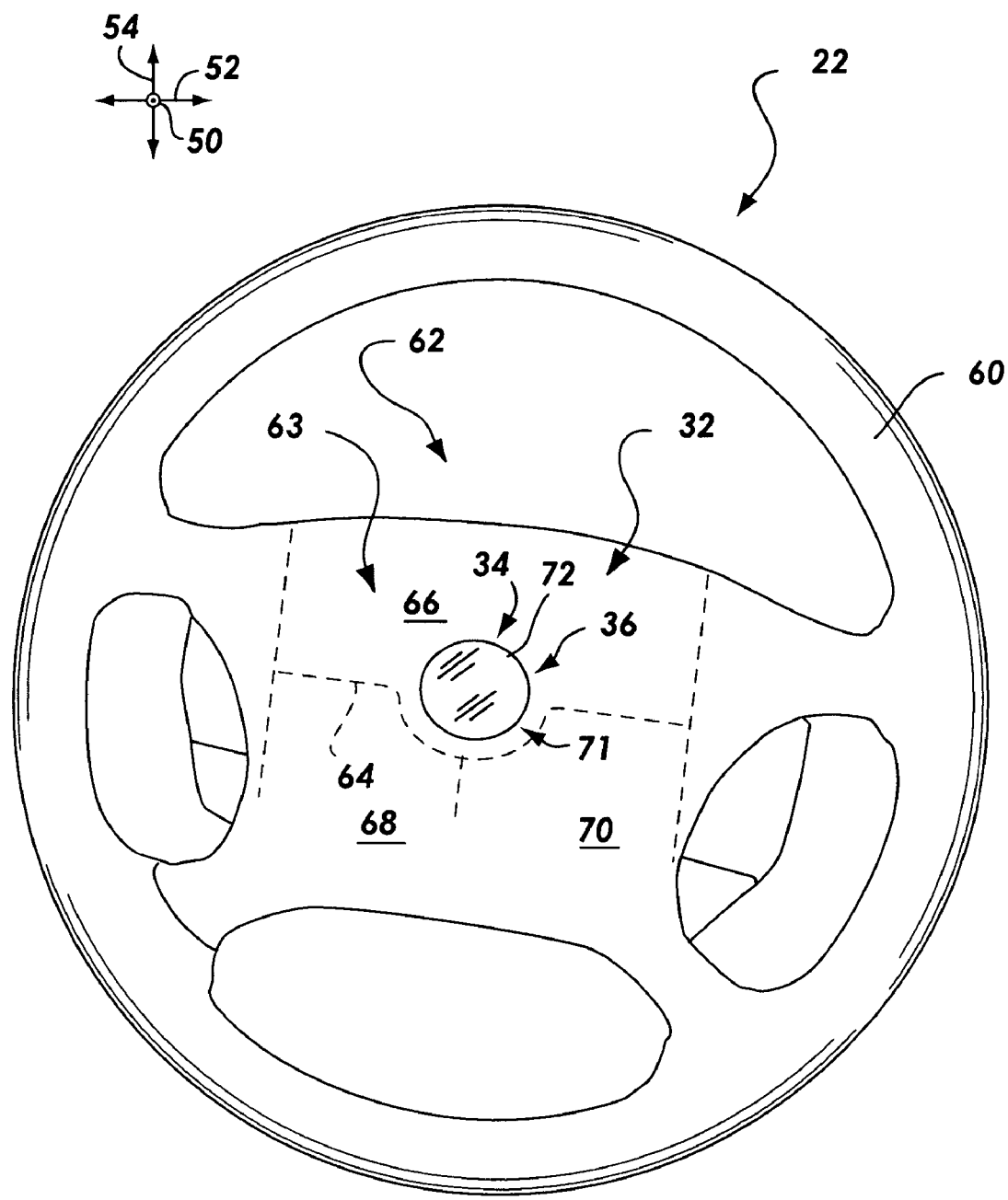
FIG. 2 is a rear elevation view of the steering wheel of the vehicle of FIG. 1, illustrating the cover assembly.

Referring to FIG. 2, a rear elevation view illustrates the steering wheel 22 in greater detail. As shown, the steering wheel 22 has a grip 60 designed to be gripped by the occupant 14 and a hub 62 encircled by the grip 60. The cover assembly 32 generally forms the hub 62 of the steering wheel 22. The cover assembly 32 includes a cover 63, which has a tear seam 64 formed therein.

The tear seam 64 may optionally be a thinner portion of the cover, preferably with the indentation on the inward side of the cover 63. The tear seam 64 is shaped such that, in response to expansion of the cushion 28 (not shown in FIG. 2), the cover 63 separates into a top flap 66, a bottom left flap 68, and a bottom right flap 70. The flaps 66, 68, 70 open outward to permit emergence of the cushion 28. The fastening assembly 34 is attached to the top flap 66, and the tear seam 64 curves to accommodate the fastening assembly 34. The fastening assembly 34 may alternatively be attached to either of the bottom left and bottom right flaps 68, 70, or may be used in conjunction with a wide variety of entirely different seam/flap configurations (not shown).

The emblem 36 includes a panel 71, which has a generally circular shape in the embodiment of FIG. 2. The panel 71 has a decorative surface 72 disposed to face the occupant 14. The decorative surface 72 may be molded in place, screen printed, bonded to a substrate, or otherwise provided. If desired, the emblem 36 may be injection molded from a polymeric material, and the decorative surface 72 may be provided via a printing operation.

Referring to FIG. 3, a perspective view illustrates the cover assembly 32, with only a portion of the cover 63 shown, as viewed from within the hub 62 of the steering wheel 22. As illustrated, the fastening assembly 34 includes a backing member 80 in addition to the emblem 36. The backing member 80 is able to slide into engagement with the emblem 36 in a manner that will be described in greater detail subsequently.

The panel 71 of the emblem 36 has a backing surface 82 disposed on the opposite side of the panel 71 from the decorative surface 72. A first protrusion 84 extends from the backing surface 82 in a direction generally perpendicular to the backing surface 82 (i.e., in the longitudinal direction 50). The first protrusion 84 extends through a first opening 85 formed in the cover 63. Similarly, a second protrusion 86 extends from the backing surface 82 through a second opening 87 in the cover 63. An orientation post 88 extends through a third opening 89 in the cover 63.

Each of the first and second protrusions 84, 86 has a proximal end 90 disposed adjacent to the backing surface 82 and a distal end 92 displaced from the backing surface 82. The distal end 92 of each of the protrusions 84, 86 is larger than the corresponding proximal end 90 in the lateral direction 52 and in the transverse direction 54. Each of the protrusions 84, 86 also has a bore 94 extending along the longitudinal direction 50. Each bore 94 extends entirely through the corresponding protrusion 84, 86 and into the panel 71 to avoid the formation of depressions in the decorative surface 72 as a result of plastic cooling during manufacture.

The backing member 80 may be formed of a metal such as steel via a method such as stamping. The backing member 80 has a plate 100 disposed generally parallel to the panel 71 of the emblem 36. The plate 100 has a central potion 102 and a support member in the form of an arch 104 extending from the central potion 102. The arch 104 extends generally coextensively with the panel 71 to help support the portion of the top flap 66 between the emblem 36 and the backing member 80, thereby resisting cut-through of the top flap 66 by the emblem 36 and/or the backing member 80 during deployment. The arch 104 is an optional feature, and may be reconfigured or omitted in other embodiments.

The central portion 102 has a hole 105 that helps to reduce the weight and material cost of the backing member 80. The plate 100 also has a first slot 106 and a second slot 108, which are positioned to receive the first and second protrusions 84, 86, respectively. Each of the first and second slots 106, 108 has a first end 110 and a second end 112. The first ends 110 are open to permit entry of the proximal ends 90 of the protrusions 84, 86 along the transverse direction 54. The second ends 112 of the slots 106, 108 are closed to form stops to limit the transverse travel of the proximal ends 90.

The plate 100 has a first locking member and a second locking member, which are disposed proximate the first and second slots 106, 108, respectively. In the embodiment of FIG. 3, the first and second locking members take the form of a first tab 114 and a second tab 116, respectively. As shown, the outward side of the first tab 114 forms a portion of the first slot 106 and the outward side of the second tab 116 forms a portion of the second slot 108.

The first and second tabs 114, 116 are angled such that they extend outward (i.e., in the longitudinal direction 50) from the remainder of the plate 100. Each of the tabs 114, 116 has a retention edge 118 positioned to abut the distal end 92 of the corresponding protrusion 84, 86. The manner in which the backing member 80 slides into engagement with the emblem 36 and locks into place will be shown and described in greater detail in connection with FIG. 4.

Referring to FIG. 4, a side elevation, section view illustrates the cover assembly 32, with only a portion of the cover 63 shown. The section is taken through the lines designated 4—4 in FIG. 3, and hence, the section bisects the second protrusion 86. As shown, the second opening 87 is large enough to permit passage of the distal end 92 of the second protrusion 86. The first opening 85 is similarly large enough to permit passage of the distal end 92 of the first protrusion 84. The arch 104 of the plate 100 is substantially coextensive with the panel 71, and thus extends in the transverse direction 54 to have an edge generally aligned with an edge of the panel 71.

In order to install the fastening assembly 34, the emblem 36 is first aligned with the cover 63 so that the first and second protrusions 84, 86 align with the first and second openings 85, 87 and the orientation post 88 aligns with the third opening 89. Then, the emblem 36 and the cover 37 are moved relatively in the longitudinal direction 50 until the backing surface 82 of the panel 71 lies against the exterior surface of the cover 63, as shown in FIG. 4.

The backing member 80 is then placed against the interior surface of the cover 63 in such a manner that the first and second slots 106, 108 are aligned with the proximal ends 90 of the first and second protrusions 84, 86, respectively, along the transverse direction 54. The backing member 80 may then be moved along the transverse direction 54, or leftward in FIG. 4, so that the proximal ends 90 of the protrusions 84, 86 enter the first ends 110 of the first and second slots 106, 108, respectively. This motion may be termed "simple rectilinear translation," which is simply motion along a straight line, without rotation. In alternative embodiments, simple rotation or a combination of rotation and linear motion may be used to provide engagement, as will be described subsequently.

Moving the backing member 80 may be accomplished by, for example, keeping the cover 63 and the emblem 36 stationary and moving the backing plate 80. In this application, reference to motion of the protrusions 84, 86 with respect to the slots 106, 108 may mean motion of the backing member 80, the emblem 36, or both.

When the proximal ends 90 of the protrusions 84, 86 are within the slots 106, 108, the material of the plate 100 on either side of the slots 106, 108 interferes with motion of the distal ends 92 back through the first and second openings 85, 87. Thus, the backing plate 80 engages the emblem 36. However, since the proximal ends 90 can be relatively freely withdrawn from the slots 106, 108 along the transverse direction 54 by reversing the relative motion described above, the emblem 36 and the backing member 80 are not yet locked together.

The backing member 80 may be moved further along the transverse direction 54 so that the proximal ends 90 of the protrusions 84, 86 move from the first ends 110 to the second ends 112 of the slots 106, 108. As the proximal ends 90 move from the first ends 110 to the second ends 112, the distal ends 92 of the protrusions 84, 86 press longitudinally against the tabs 114, 116, or downward in FIG. 4, to cause each of the tabs 114, 116 to move to a deflected position 120, as shown in phantom in FIG. 4. The distal ends 92 are then able to slide over the tabs 114, 116 to permit the proximal ends 90 to reach the second ends 112 of the slots 106, 108.

By the time the proximal ends 90 of the protrusions 84, 86 reach the second ends 112 of the slots 106, 108, the distal ends 92 have moved clear of the tabs 114, 116 to permit the tabs 114, 116 to spring back to their undeflected or less deflected positions. The retention edges 118 of the tabs 114, 116 are then positioned to abut the distal ends 92, either continuously or in response to slight motion of the proximal ends 90 toward the first ends 110 of the slots 106, 108. The tabs 114, 116 thus prevent the proximal ends 90 of the protrusions 84, 86 from exiting the slots 106, 108.

Consequently, the emblem 36 and the backing member 80 are locked into engagement with each other, and will not be detached during deployment of the airbag module 12. Installation of the backing member 80 toward the tear seam 64 helps avoid breakage of the tabs 114, 116 during deployment; however, the backing member 80 may be installed along different directions in alternative embodiments of the invention.

The above described method may be performed in a number of ways. For example, the steps above may all be performed by hand. Alternatively, some or all of the steps described above may be performed via automated machinery. According to one example, the emblem 36 is positioned against the cover 63 by hand, and the cover 63 and the emblem 36 are inserted into a machine that applies the backing member 80. Regardless of which method is used, the emblem 36 of this embodiment can only be attached to the cover 63 in the correct orientation, and the backing member 80 provides positive, certain locking via the operation of the tabs 114, 116. Hence, there is little probability that the fastening assembly 34 will be improperly installed.

In other embodiments, different protrusions, slots, and/or locking members may be used. For example, in certain embodiments, one large tab may be used, and may span the distance between two slots to provide locking for two protrusions. Alternatively, only one or more than two protrusions may be used. As another alternative, a locking member besides a tab may be used; for example, a spring/detent system (not shown) or any type of resilient latching system may be used to provide locking.

Additionally, the protrusions need not have a circular or annular cross section, but may have any desired cross sectional shape, including polygonal shapes or non-circular, curved shapes. Furthermore, rather than having slots with open ends, the slots of the backing member may be keyhole-shaped so that the protrusions can be inserted into the wider portions of the slots along a direction perpendicular to the slots, and then moved to the narrower portions to provide engagement.

Furthermore, as mentioned previously, other embodiments are not limited to engagement via simple rectilinear motion. For example, in certain embodiments, a backing member may have two or more slots that are arranged such that rotation of the backing member can be used to move the slots into engagement with corresponding protrusions. If desired, the slots may be curved to facilitate rotational motion of the slots with respect to the protrusions. The slots may be arranged about the backing member in a radially symmetrical manner.

Each of the slots may have one end so that the backing member can be positioned against the surface of the cover, rotated to cause the protrusions to slide into the slots, and then rotated further to cause the protrusions to rotate along the slots, to the closed ends of the slots. Locking members such as tabs may disposed proximate the slots to lock the protrusions with respect to the slots, thereby preventing rotation of the backing member out of engagement with the protrusions.

Returning to the embodiment of FIG. 4, the cooperation of the protrusions 84, 86 and the slots 106, 108 provides sufficient engagement to keep the backing member 80 and the emblem 36 together without adding features to enhance retention. However, in other embodiments, additional features may be used. One such embodiment will be shown and described in connection with FIG. 5.

Figure 5:
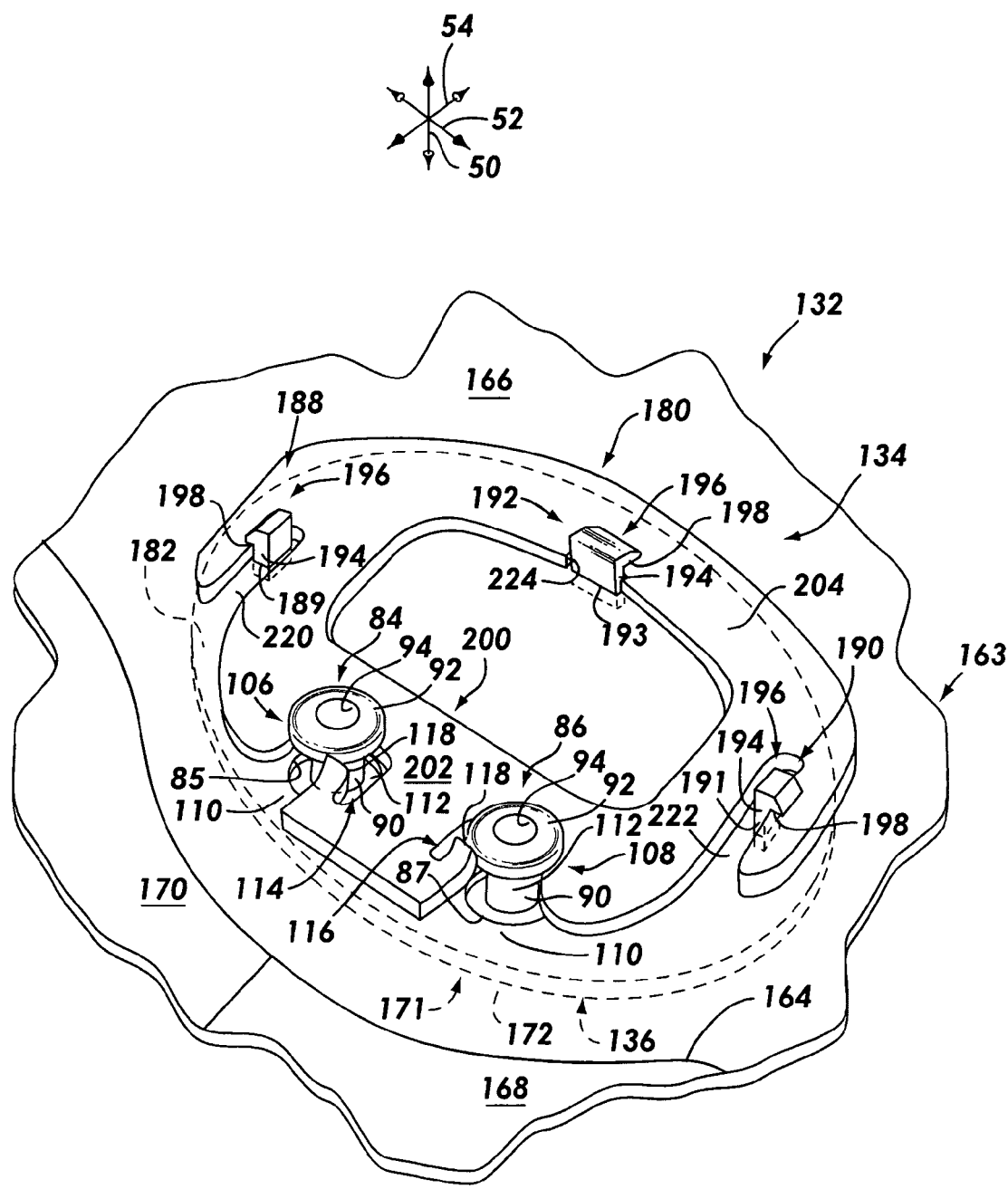
FIG. 5 is a perspective view of the interior of a steering wheel of a vehicle, illustrating a cover assembly according to one alternative embodiment of the invention.

Referring to FIG. 5, a perspective view illustrates a portion of a cover assembly 132 according to one alternative embodiment of the invention, as viewed from within a hub of a steering wheel (not shown). The cover assembly 132 includes a fastening assembly 134 having an emblem 136 attached to a cover 163 of the cover assembly 132. As shown, the emblem 136 is generally elliptical in shape, and thus the cover 163 has a tear seam 164 shaped slightly differently from the tear seam 64 of the previous embodiment to accommodate the shape of the emblem 136. The tear seam 164 divides the cover 163 into a top flap 166, a bottom left flap 168, and a bottom right flap 170.

The emblem 136 has a panel 171 with a generally elliptical shape. The panel 171 has a decorative surface 172 oriented toward a vehicle occupant. As with the decorative surface 72 of the previous embodiment, the decorative surface 172 may display a manufacturer's logo or some other image designed to enhance the appearance of the cover assembly 132. The fastening assembly 134 includes a backing member 180 designed to engage the emblem 136 in a lockable fashion.

As shown, the panel 171 has a backing surface 182 on the opposite side of the panel 171 from the decorative surface 172. Like the emblem 36 of the previous embodiment, the emblem 136 includes a first protrusion 84 disposed to extend from the backing surface 182 through a first opening 85 in the cover 163 and a second protrusion 86 disposed to extend from the backing surface 182 through a second opening 87 of the cover 163. Each of the first and second protrusions 84, 86 may be substantially the same as those of the previous embodiment, and may thus have the cross sectional shape illustrated in FIG. 4, with a proximal end 90, a distal end 92 larger than the proximal end, and a bore 94 extending through the distal and proximal ends 92, 90.

Furthermore, the emblem 136 includes a number of supplemental retention members extending from the backing surface 182 to engage the backing member 180. The supplemental retention members include first hook 188 disposed to be inserted through a third opening 189 of the cover 163, a second hook 190 disposed to be inserted through a fourth opening 191 of the cover 163, and a third hook 192 disposed to be inserted through a fifth opening 193 of the cover 163.

Each of the hooks 188, 190, 192 has a shank 194 adjacent to the backing surface 182 and a head 196 at the end of the corresponding shank 194. Each head 196 has a retention surface 198 generally parallel to the backing surface 182. The hooks 188, 190, 192 cooperate with the protrusions 84, 86 to engage the backing member 180 in a manner that will be described in greater detail subsequently.

The backing member 180 has a plate 200 disposed generally parallel to the panel 171 of the emblem 136. The plate 200 has a central portion 202 and a support member, in the form of an arch 204, extending from the central portion 202 to support the cover 163 against tear-through during airbag module deployment. Like the backing plate 80 of the previous embodiment, the backing plate 180 has a first slot 106 disposed to receive the first protrusion 84 and a second slot 108 disposed to receive the second protrusion 86. The first and second slots 106, 108 each have a first end 110 and a second end 112. The first ends 110 are open such that the slots 106, 108 are able to slide into engagement with the protrusions 84, 86 when the backing member 180 is moved parallel to the panel 171.

The plate 200 also has first and second locking members, which take the form of first and second tabs 114, 116 like those of the previous embodiment. The tabs 114, 116 deflect toward a deflected position generally parallel to the panel 171 in response to pressure from the distal ends 92 to permit the proximal ends 90 to move from the first ends 110 to the second ends 112 of the slots 106, 108. When the proximal ends 90 are at or near the second ends 112 of the slots 106, 108, the tabs 114, 116 spring back to a less deflected state so that retention edges 118 of the tabs 114, 116 abut the distal ends 92 to keep the proximal ends 90 from moving back toward the first ends 110 of the slots 106, 108. Thus, the plate 200 may be rectilinearly inserted into engagement with the emblem 136 and locked in place in a manner similar to that of the previous embodiment.

In addition to the slots 106, 108, the plate 200 has a first supplemental slot 220, a second supplemental slot 222, and a third supplemental slot 224. The first and second supplemental slots 220, 222 are disposed on either side of the central portion 202 of the plate 200, and the third supplemental slot 224 is disposed on the arch 204. The first, second, and third supplemental slots 220, 222, 224 are disposed to receive the first, second, and third hooks 188, 190, 192 while the proximal ends 90 of the protrusions 84, 86 move toward the second ends 112 of the first and second slots 106, 108.

When the hooks 188, 190, 192 are positioned in the slots 220, 222, 224, respectively, the retention surfaces 198 of the hooks 188, 190, 192 abut portions of the plate 200 adjacent to the slots 220, 222, 224. The retention surfaces 198 may effectively grip the plate 200 against the cover 163 to enhance the engagement of the backing member 180 with the emblem 136. Such enhanced engagement may further prevent the emblem 136 from detaching from the cover 163 during airbag module deployment.

Despite such enhanced engagement, the cover assembly 132 may be assembled in a manner substantially similar to that of the previous embodiment; no additional steps need be performed. The hooks 188, 190, 192 and the supplemental slots 220, 222, 224 engage each other through the same relative motion between the emblem 136 and the backing member 180 that is already used to engage the protrusions 84, 86 with the slots 106, 108. Thus, the method by which the cover assembly 132 is assembled may be substantially as described previously, in connection with the previous embodiment. The emblem 136 may be manufactured of plastic via injection molding or the like, and the backing member 180 may be stamped from a metal such as steel.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag module for protecting an occupant of a vehicle from impact, the airbag module comprising:

an inflator that produces pressurized gas in response to receipt of an activation signal;

a cushion that receives the pressurized gas and inflates to receive the impact; and a cover assembly comprising a cover shaped to cover the cushion, the cover having a first opening, an emblem comprising a panel having a decorative surface and a first protrusion extending from the panel, wherein the first protrusion comprises a distal end shaped to pass through the opening, and a backing member insertable into engagement with the first protrusion in a direction generally parallel to the panel to restrict withdrawal of the distal end through the opening, the backing member comprising a first locking member disposed to restrict withdrawal of the backing member from engagement with the protrusion, wherein the backing member comprises a first slot comprising a first end and a second end, wherein the first slot is sized to receive a proximal end of the first protrusion to enable insertion of the backing member into engagement with the first protrusion, wherein the first end of the first slot is open such that the first end can be inserted into engagement with the proximal end via simple rectilinear translation of the backing member along the direction, toward the proximal end, wherein the first locking member comprises a first tab adjacent to the first slot, wherein the first tab is angled such that the first tab bends toward a position parallel with the first slot in response to motion of the proximal end toward the second end of the first slot.

2. The airbag module of claim 1, wherein the cushion is shaped to provide driver's side, front impact protection and the cover is attached to a steering wheel of the vehicle.

3. The airbag module of claim 1, wherein the distal end is larger than the proximal end in at least one direction perpendicular to an axis of the first protrusion.

4. The airbag module of claim 1 wherein the backing member further comprises a second slot and a second locking member, the second slot comprising a first end and a second end, wherein the second slot is sized to receive a proximal end of a second protrusion of the emblem to enable insertion of the backing member into engagement with the second protrusion, wherein the second locking member is disposed to restrict withdrawal of the backing member from engagement with the second protrusion.

5. The airbag module of claim 1, wherein the backing member further comprises a support member extending generally parallel to the panel, wherein the support member is shaped to resist damage to the cover during deployment.

6. A fastening assembly for enhancing an appearance of a cover for covering a cushion of an airbag module for protecting an occupant of a vehicle from impact, the fastening assembly comprising:
an emblem comprising a panel having a decorative surface and a first protrusion extending from the panel, wherein the first protrusion comprises a distal end shaped to pass through a first opening of the cover; and
a backing member insertable into engagement with the first protrusion in a direction generally parallel to the panel to restrict withdrawal of the distal end through the first opening, wherein the backing member is lockable to restrict withdrawal of the backing member from engagement with the first protrusion, wherein the backing member comprises a first slot comprising a first end and a second end, wherein the first slot is sized to receive a proximal end of the first protrusion to enable insertion of the backing member into engagement with the first protrusion, wherein the first end of the first slot is open such that the first end can be inserted into engagement with the proximal end via simple rectilinear translation of the backing member along the direction, toward the proximal end, wherein a first locking member comprises a first tab adjacent to the first slot, wherein the first tab is angled such that the first tab bends toward a position parallel with the first slot in response to motion of the proximal end toward the second end of the first slot.

7. The fastening assembly of claim 6, wherein the distal end is larger than the proximal end in at least one direction perpendicular to an axis of the first protrusion.

8. The fastening assembly of claim 7, wherein the backing member comprises a first slot and a second slot, each of which comprises a first end and a second end, wherein the first slot is sized to receive the proximal end of the first protrusion to enable insertion of the backing member into engagement with the first protrusion and the second slot is sized to receive a proximal end of a second protrusion extending from the panel, wherein the second protrusion comprises a distal end shaped to pass through a second opening of the cover, wherein the first and second slots are disposed such that rotation of the backing member induces the proximal ends of the first and second protrusions to move along the first and second slots, respectively, toward the second ends thereof to lock engagement of the backing member with the protrusions.

9. A fastening assembly for enhancing an appearance of a cover for covering a cushion of an airbag module for protecting an occupant of a vehicle from impact, the fastening assembly comprising:
an emblem comprising a panel having a decorative surface and a protrusion extending from the panel, wherein the protrusion comprises a distal end shaped to pass through an opening of the cover; and
a backing member comprising a slot having an open end such that the slot is insertable into engagement with the protrusion in a direction generally parallel to the panel such that the backing member restricts withdrawal of the distal end through the opening, wherein the backing member comprises a first slot comprising a first end and a second end, wherein the first slot is sized to receive a proximal end of a first protrusion to enable insertion of the backing member into engagement with the first protrusion, wherein the first end of the first slot is open such that the first end can be inserted into engagement with the proximal end via simple rectilinear translation of the backing member alone the direction, toward the proximal end, wherein a first locking member comprises a first tab adjacent to the first slot, wherein the first tab is angled such that the first tab bends toward a position parallel with the first slot in response to motion of the proximal end toward the second end of the first slot.

10. The fastening assembly of claim 9, wherein the distal end is larger than the proximal end in at least one direction perpendicular to an axis of the first protrusion.

11. A backing member for a fastening assembly for fastening an article proximate an opening of a wall, the article comprising a panel and a first protrusion extending from the panel, wherein the first protrusion comprises a proximal end adjacent to the panel and a distal end shaped to pass through the opening, the backing member comprising:
a plate comprising a first slot sized to receive the proximal end to provide engagement of the article by the backing member, the first slot having a first end and a second end; and
a first tab disposed to abut the distal end in response to motion of the proximal end from the first end to the second end of the first slot to restrict motion of the proximal end toward the first end, wherein the backing member comprises a first slot comprising a first end and a second end, wherein the first slot is sized to receive a proximal end of the first protrusion to enable insertion of the backing member into engagement with the first protrusion, wherein the first end of the first slot is open such that the first end can be inserted into engagement with the proximal end via simple rectilinear translation of the backing member along the direction, toward the proximal end, wherein a first locking member comprises a first tab adjacent to the first slot, wherein the first tab is angled such that the first tab bends toward a position parallel with the first slot in response to motion of the proximal end toward the second end of the first slot.

12. The backing member of claim 11, wherein the wall comprises an airbag cover and the article comprises an emblem comprising a decorative surface, wherein the plate is shaped to resist damage to the cover during deployment.

13. The backing member of claim 12, further comprising an arch extending generally parallel to the panel and substantially coextensive with a portion of the panel.

14. The backing member of claim 11, wherein the plate further comprises a second tab and a second slot sized to receive a proximal end of a second protrusion extending from the panel to further provide engagement of the article by the backing member, wherein the second tab is disposed to abut a distal end of the second protrusion in response to motion of the proximal end of the second protrusion from the first end to the second end of the second slot to restrict motion of the proximal end of the second protrusion toward the first end of the second slot.

15. The backing member of claim 14, wherein the first and second slots are disposed such that rotation of the backing member induces the proximal ends of the first and second protrusions to move along the first and second slots, respectively, toward the second ends thereof.

16. A method for fastening an emblem to a cover for covering a cushion of an airbag module for protecting an occupant of a vehicle from impact, the cover comprising a first opening, the emblem comprising a panel having a decorative surface and a first protrusion extending from the panel, wherein the protrusion comprises a distal end shaped to pass through the first opening, the backing member comprising a first slot having a first end and a second end, wherein the first end is open, the method comprising:
    inserting the distal end through the first opening;
    sliding the backing member in a direction generally parallel to the panel such that the proximal end of the first protrusion enters the first end of the first slot; and
    further sliding the backing member in the direction to move the proximal end from the first end to the second end to induce engagement of the first protrusion by the backing member to restrict withdrawal of the distal end through the first opening, wherein the first slot is sized to receive a proximal end of the first protrusion to enable insertion of the backing member into engagement with the first protrusion, wherein the first end of the first slot is open such that the first end can be inserted into engagement with the proximal end via simple rectilinear translation of the backing member along the direction, toward the proximal end, wherein the backing member comprises a first locking member, wherein the first locking member comprises a first tab adjacent to the first slot, wherein the first tab is angled such that the first tab bends toward a position parallel with the first slot in response to motion of the proximal end toward the second end of the first slot.

17. The method of claim 16, wherein the cushion is shaped to provide driver's side, front impact protection and the cover is attached to a steering wheel of the vehicle, wherein sliding the backing member in the direction comprises sliding the backing member against an interior surface of the cover.

18. The method of claim 17, wherein the backing member further comprises a support member extending generally parallel to the panel to resist damage to the cover during deployment, wherein sliding the backing member in the direction comprises disposing the support member to abut the interior surface.

19. The method of claim 16, wherein the distal end is larger than the proximal end in at least one direction perpendicular to an axis of the first protrusion, wherein the backing member comprises a plate in which the slot is formed, wherein inducing engagement of the first protrusion by the backing member comprises disposing the distal end to abut the plate at a location proximate the slot.

20. The method of claim 16, the method further comprising locking the relative positions of the first protrusion and the first slot with the first locking member to restrict withdrawal of the backing member from engagement with the first protrusion.

21. The method of claim 20, wherein the first locking member comprises a tab adjacent to the first slot, wherein sliding the backing member in the direction comprises deflecting the tab and locking the relative positions of the first protrusion and the first slot comprises relieving deflection of the tab such that the tab abuts the distal end to block motion of the distal end toward the first end of the first slot.

22. The method of claim 16, wherein the cover comprises a second opening and the backing member further comprises a locking member and a second slot shaped to receive a second protrusion extending from the panel, wherein sliding the backing member in the direction comprises causing a proximal end of the second protrusion to enter a first end of the second slot, wherein further sliding the backing member in the direction comprises moving the proximal end of the second protrusion from the first end to a second end of the second slot to induce engagement of the second protrusion by the backing member to restrict withdrawal of the distal end of the second protrusion through the second opening.

23. A method for locking a backing member into engagement with an article proximate a first opening of a wall, an emblem comprising a panel and a first protrusion extending from the panel, wherein the first protrusion comprises a proximal end adjacent to the panel and a distal end shaped to pass through the first opening, the backing member comprising a first slot having a first end and a second end, and a first tab, the method comprising:
    deflecting the first tab in response to motion of the proximal end of the first protrusion toward the second end; and
    relieving deflection of the first tab in response to further motion of the proximal end toward the second end such that the first tab blocks motion of the proximal end toward the first end of the first slot, wherein the first slot is sized to receive a proximal end of the first protrusion to enable insertion of the backing member into engagement with the first protrusion, wherein the first end of the first slot is open such that the first end can be inserted into engagement with the proximal end via simple rectilinear translation of the backing member along the direction, toward the proximal end, wherein the backing member comprises a first locking member, wherein the first tab adjacent to the first slot, wherein the first tab is angled such that the first tab bends toward a position parallel with the first slot in response to motion of the proximal end toward the second end of the first slot.

24. The method of claim 23, wherein the wall comprises an airbag cover and the article comprises an emblem comprising a decorative surface, the method further comprising inserting the distal end through the first opening prior to motion of the proximal end of the first protrusion toward the second end of the first slot.

25. The method of claim 24, the method further comprising, prior to deflection of the first tab:
    aligning the backing member with the proximal end; and
    moving the backing member toward the proximal end such that the proximal end enters the first end of the first slot via simple rectilinear translation along a direction generally parallel to the panel.

26. The method of claim 24, wherein the emblem further comprises a second protrusion extending from the panel, wherein the second protrusion comprises a proximal end adjacent to the panel and a distal end shaped to pass through a second opening of the wall, the backing member comprising a second slot having a first end and a second end, and a second tab, the method further comprising:
- rotating the backing member such that the proximal ends of the first and second protrusions pass from the first ends toward the second ends of the first and second slots, respectively;
- deflecting the second tab in response to motion of the proximal end of the second protrusion toward the second end of the second slot; and
- relieving deflection of the second tab in response to further motion of the proximal end toward the second end of the second slot such that the second tab blocks motion of the proximal end toward the first end of the second slot.

27. The method of claim 23, wherein the wall comprises a second opening and the backing member further comprises a second tab and a second slot shaped to receive a second protrusion extending from the panel, the method further comprising:
- deflecting the second tab in response to motion of a proximal end of the second protrusion toward a second end of the second slot; and
- relieving deflection of the second tab in response to further motion of the proximal end of the second protrusion toward the second end of the second slot such that the second tab blocks motion of the proximal end of the second protrusion toward the first end of the second slot.

* * * * *